Feb. 14, 1961  F. W. BARRY  2,971,329
AIR-INLET CONTROLLER
Filed July 20, 1959
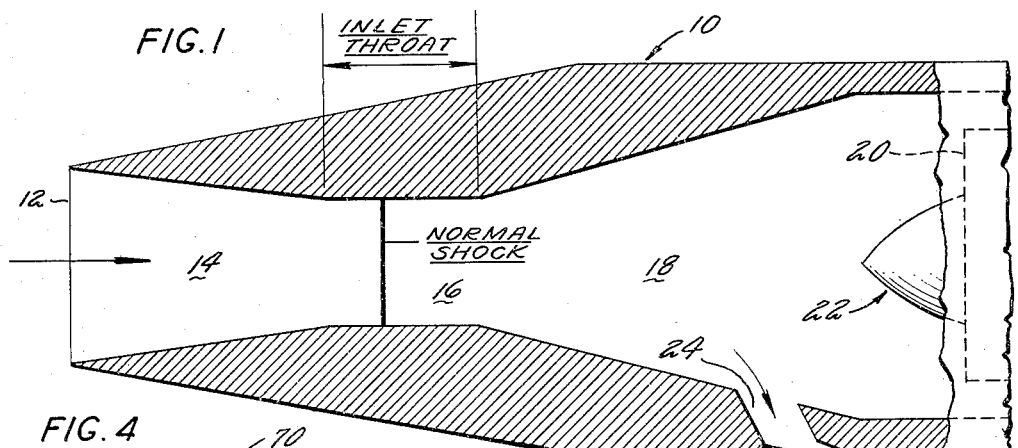
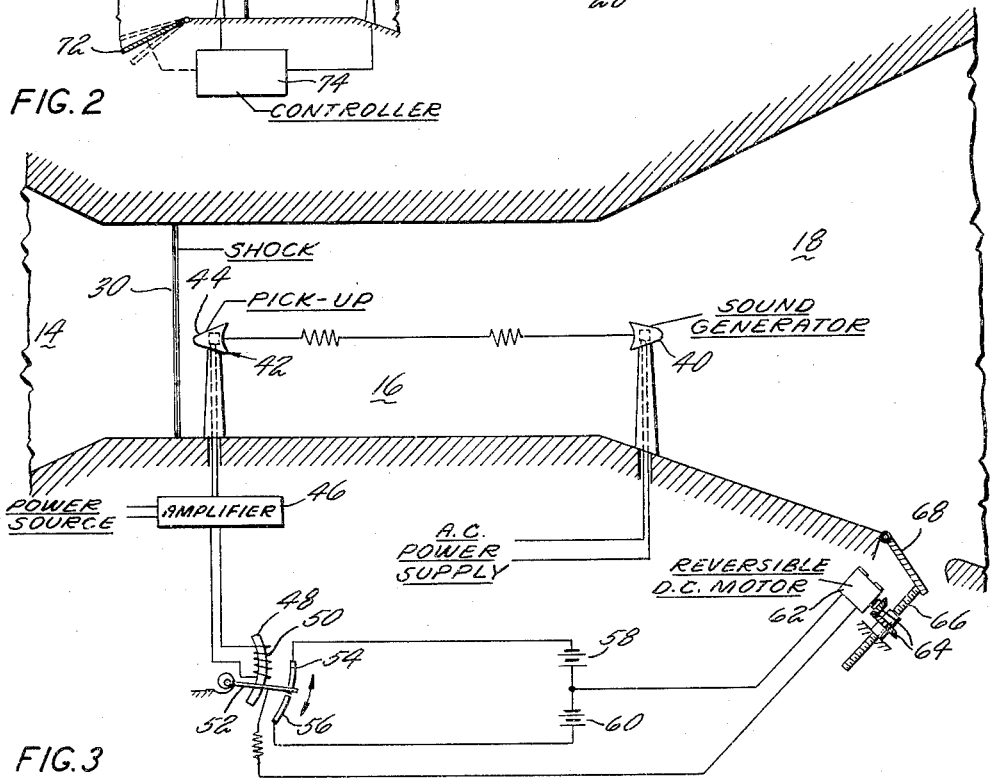
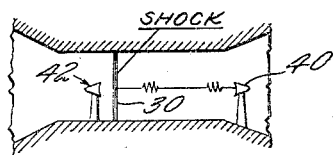
INVENTOR
FRANK W. BARRY
BY Leonard F. Weblind
ATTORNEY United States Patent Office 2,971,329
Patented Feb. 14, 1961

2,971,329
AIR-INLET CONTROLLER

Frank W. Barry, Manchester, Conn., assignor to United Aircraft Corporation, East Hartford, Conn., a corporation of Delaware Filed July 20, 1959, Ser. No. 828,155
12 Claims. (Cl. 60—35.6)

This invention relates to high-speed air inlets for aircraft and more particularly to means for sensing and controlling the position of the normal shock within the inlet.

Air-induction systems of turbojet or ramjet-propelled aircraft capable of high supersonic flight speeds are expected to require variable geometry in order to achieve acceptable efficiencies. The inlet would use variable geometry in order that the potential performance of the induction system may be high throughout the spectrum of flight conditions anticipated. But, this potential performance can be realized only if the actual corrected air flow required by the engine equals the inlet corrected air flow corresponding to operation with this potential performance. Matching of the inlet air flow to the engine air flow may be attained by adjusting the capture flow of the inlet or by spilling the excess inlet air flow through a bypass, as illustrated herein. In the following discussion, an embodiment of the invention utilizing a variable bypass is described.

One indication of the matching of engine and inlet corrected air flows is the position of the normal shock in the inlet throat. If the shock is downstream of the desired position, the engine corrected air flow, which equals the net inlet corrected air flow (inlet corrected air flow less the bypass corrected air flow), is greater than the desired net inlet corrected air flow and the actual performance of the induction system is less than the potential. Reducing the bypass corrected air flow by closing the bypass door would decrease the inlet corrected air flow towards the desired value and would cause the shock to move upstream towards the desired shock position in the inlet throat which would provide the desired potential inlet performance. The performance of the air-induction system would thus increase towards the desired performance.

It is therefore an object of this invention to provide a supersonic air inlet for an airplane power plant or the like including means for sensing the position of the normal shock in the throat region of the inlet.

It is a further object of this invention to utilize a sound generator within the inlet and a sensitive sound pickup upstream of the generator so that the exact location of the normal shock can be accurately sensed. A signal commensurate with the shock position is then produced, which signal is intended to vary the flow characteristics in the inlet.

It is a further object of this invention to provide a shock sensor in a supersonic inlet and provide a controlling signal which can vary the opening of a downstream bypass thereby accurately positioning the shock.

It is a still further object of this invention to provide a shock sensor in a supersonic inlet and provide a controlling signal which can vary the inlet air flow thereby accurately positioning the shock.

These and other objects of this invention will become readily apparent from the following detailed description of the drawing in which:

Fig. 1 is a schematic cross section of an aircraft power plant inlet;

Fig. 2 is a schematic cross section of an enlarged portion of Fig. 1 showing the shock position sensing and controlling system;

Fig. 3 is a schematic cross section illustrating a different position of the shock wave; and Fig. 4 is a schematic cross section illustrating a variable area inlet control.

Referring to Fig. 1, an air inlet is generally indicated at 10 as having an upstream opening 12, a convergent portion 14, a throat section 16 and a divergent portion 18. The divergent portion 18 exhausts to the inlet 20 of a turbojet power plant or similar power plant generally indicated at 22. Under conditions of high-speed flight, the inlet 12 will be receiving flow at supersonic velocities and this flow will be shocked down through a normal shock preferably located in the throat 16. Downstream of the shock, the air flow is subsonic for subsequent ingestion in the engine. The flow characteristics within the inlet may be regulated by a bypass 24, the opening of which is regulated by a suitable valve 26. The valve 26 may be controlled by a servo motor 28 in a manner similar to that described in connection with Fig. 2.

Referring to Fig. 2, the throat 16 is shown as having a shock wave 30 positioned adjacent the upstream end thereof. A sound generator 40 is provided at a point adjacent the downstream end of the throat 16 and has the sound generated thereby directed in an upstream direction and aimed at a suitable pickup or microphone 42. The pickup 42 has a shield 44 which prevents its accepting sounds emanating from a region upstream thereof.

With the shock 30 positioned as shown in Fig. 2, the pickup 42 can sense a substantially strong signal from the sound generator 40 because both the sound generator and the pickup 42 are located in the subsonic stream. On the other hand, if the shock 30 is located as shown, for example, in Fig. 3, the pickup 42 lies in a supersonic stream such that the sound waves from the generator will not reach the pickup or else the signals sensed by the pickup are relatively weak.

Returning to Fig. 2, the pickup 42 has operative connections to an amplifier 46 which is connected to an iron core 48 by means of a coil 50. The spring loaded wiper 52 will be moved up and down to engage contact strips 54 or 56, depending upon the relative strength of the signal from the amplifier. Contact strip 54 is connected to a battery 58 while wiper 56 is connected to a battery 60. It will be noted that the batteries 58 and 60 are so connected so that one will cause the reversible motor 62 to move in one direction while the other will cause the motor 62 to rotate in the opposite direction. The motor 62 is connected by beveled gears 64 which will actuate a jackscrew 66 to thereby control the position of a bypass valve or door 68.

In operation, if the shock moves toward a forward position, the sound sensed by the pickup or microphone 42 increases whereby the wiper arm 52 moves up and contacts the upper contact strip 54 and thus energizes the motor 62 in a direction to open the bypass door 68 and thereby increase the bypass flow. As the shock moves in a downstream direction to a point at or upstream of the pickup 42, the sound sensed thereby decreases. This causes the wiper 52 to contact strip 56 and eventually the bypass door is moved toward a closed position.

The wiper arm 52 as well as the iron core 48 and the coil 50 may comprise an ordinary A.C. ammeter.

Fig. 4 is a schematic illustration showing an inlet having a variable capture area inlet operated by the shock sensing control to vary inlet air flow. Thus, the inlet generally indicated at 70 may have at least one movable wall 72 pivoted at 73. The position of the wall 72 may be controlled by the controller 74 which is similar in operation to that shown in Fig. 2.

As a result of this invention it is apparent that a highly accurate but simple system has been provided for sensing the position of the normal shock in a supersonic air inlet to accurately match the flow necessary for the power plant or similar device while obtaining optimum efficiency from the inlet configuration.

Although one embodiment of this invention has been illustrated and described herein, it will be apparent that various changes may be made in the construction and arrangement of the various parts without departing from the scope of the novel concept.

I claim:

1. In a flow control for a duct having supersonic fluid flow in at least a portion of its length and having a portion therein where a shock wave may be located, a sound generator in said duct located downstream of the shock for producing sound waves which travel in an upstream direction toward the shock, a sound pickup in said duct adjacent the region where the shock is to be located for sensing the sound generated by said sound generator, and signal generating means connected to the said pickup for producing a signal dependent upon whether the shock is upstream or downstream of the pickup.

2. In a flow control for a duct having a supersonic fluid flow in at least a portion of its length and having a portion therein where a shock wave may be located, means for controlling a parameter of flow in said duct, a sound generator in said duct located downstream of the shock for producing sound waves which travel in an upstream direction toward the shock, a sound pickup in said duct adjacent the region where the shock is to be located for sensing the sound generated by said sound generator, signal producing means responsive to the sound sensing of said pickup, and means responsive to said signal producing means for operating said parameter controlling means to position the shock.

3. In a control according to claim 2 including a servo device interconnecting signal producing means and said means for operating said parameter controlling means.

4. In a flow control for a duct having supersonic fluid flow in at least a portion of its length and having a portion therein where a shock wave may be located, means located downstream of the shock for bleeding fluid from the duct, a signal generator in said duct located downstream of the shock for producing signals which travel in an upstream direction toward the shock, the propagation of said signals being affected by said shock, pickup means in said duct adjacent the region where the shock is to be located for sensing the signals from said signal generator, signal producing means responsive to the signal sensing of said pickup means, and means responsive to said signal producing means for varying the flow through said bleeding means.

5. In a flow control according to claim 4 wherein said bleed includes a variable area orifice and said signal producing means includes a controller for varying the area of said orifice.

6. In a control for a duct having supersonic fluid flow in at least a portion of its length and having a portion therein where a shock wave may be located, means located downstream of the shock for bleeding fluid from the duct, a sound generator in said duct located downstream of the shock for producing sound waves which travel in an upstream direction toward the shock, a microphone in said duct adjacent the region where the shock is to be located, said microphone facing in a downstream direction and being shielded from sounds emanating from upstream thereof, electrical signal producing means responsive to the sound sensing of said microphone, and servo means responsive to said signal producing means for varying the flow through said bleeding means.

7. In a control for a duct having supersonic fluid flow in at least a portion of its length and having a portion therein where a shock wave may be located, means located downstream of the shock for bleeding fluid from the duct, a sound generator in said duct located downstream of the shock for producing sound waves which travel in an upstream direction toward the shock, a sound pickup in said duct adjacent the region where the shock is to be located, said pickup facing in a downstream direction and being shielded from sounds emanating from upstream thereof, signal producing means responsive to the sound sensing of said pickup, and means responsive to said signal producing means for varying the flow through said bleeding means.

8. In a flow control for a duct having supersonic fluid flow in at least a portion of its length and having a portion therein where a shock wave may be located, means for varying the inlet air flow, a signal generator in said duct located downstream of the shock for producing signals which travel in an upstream direction toward the shock, the propagation of said signal being affected by said shock, pickup means in said duct adjacent the region where the shock is to be located for sensing the signals from said signal generator, signal producing means responsive to the signal sensing of said pickup means, and means responsive to said signal producing means for controlling said inlet flow varying means.

9. In a flow control according to claim 8 wherein said inlet air flow varying means includes a movable member and said signal producing means includes a controller for varying the position of said member.

10. In a control for a duct having supersonic fluid flow in at least a portion of its length and having a portion therein where a shock wave may be located, means for regulating the inlet air flow, a sound generator in said duct located downstream of the shock for producing sound waves which travel in an upstream direction toward the shock, a microphone in said duct adjacent the region where the shock is to be located, said microphone facing in a downstream direction and being shielded from sounds emanating from upstream thereof, electrical signal producing means responsive to the sound sensing of said microphone, and servo means responsive to said signal producing means for controlling said regulating means.

11. In a control for an air inlet duct having supersonic fluid flow in at least a portion of its length and having a portion therein where a shock wave may be located, means for regulating the inlet air flow, a sound generator in said duct located downstream of the shock for producing sound waves which travel in an upstream direction toward the shock, a sound pickup in said duct adjacent the region where the shock is to be located, said pickup facing in a downstream direction and being shielded from sounds emanating from upstream thereof, signal producing means responsive to the sound sensing of said pickup, and means responsive to said signal producing means for controlling said regulating means.

12. In a control for a duct having supersonic fluid flow in at least a portion of its length and having a region therein wherein a shock wave may be located, means for varying a parameter of flow in the duct, a signal generator in a downstream subsonic region of flow in said duct for generating a signal traveling upstream toward the shock, the propagation of said signal being affected by said shock, means in the vicinity of the shock for receiving the signals from said signal generator, means generating a control signal in response to the signal received by said receiving means, and means responsive to said control signal for varying said parameter varying means.

References Cited in the file of this patent

UNITED STATES PATENTS 2,274,262    Wolff _____ Feb. 24, 1942
2,914,915    Sziklas _____ Dec. 1, 1959

OTHER REFERENCES

"Engine Intake Controls," by Stack; Flight, vol. 72, No. 2553, pages 1000–1002, Dec. 27, 1957; published by Thomas Skinner and Co. Ltd., 111 Broadway, New York 6, N.Y.